United States Patent
Staar et al.

(10) Patent No.: US 11,495,038 B2
(45) Date of Patent: Nov. 8, 2022

(54) DIGITAL IMAGE PROCESSING

(71) Applicant: INTERNATIONAL BUSINESS MACHINES CORPORATION, Armonk, NY (US)

(72) Inventors: Peter Willem Jan Staar, Wädenswil (CH); Michele Dolfi, Zurich (CH); Christoph Auer, Zurich (CH); Leonidas Georgopoulos, Zurich (CH); Konstantinos Bekas, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 16/811,490

(22) Filed: Mar. 6, 2020

(65) Prior Publication Data

US 2021/0279532 A1 Sep. 9, 2021

(51) Int. Cl.
*G06V 30/196* (2022.01)
*G06K 9/62* (2022.01)
*G06N 3/08* (2006.01)
*G06V 30/413* (2022.01)
*G06V 30/414* (2022.01)

(52) U.S. Cl.
CPC ....... *G06V 30/1983* (2022.01); *G06K 9/6257* (2013.01); *G06N 3/08* (2013.01); *G06V 30/413* (2022.01); *G06V 30/414* (2022.01)

(58) Field of Classification Search
CPC .............. G06V 30/413; G06V 30/414; G06V 30/1983; G06K 9/6257; G06N 3/08
See application file for complete search history.

(56) References Cited

U.S. PATENT DOCUMENTS

| 5,021,989 A | 6/1991 | Fujisawa |
| 5,781,785 A | 7/1998 | Rowe |
| 5,818,966 A | 10/1998 | Prasad |
| 6,401,097 B1 | 6/2002 | McCotter |

(Continued)

FOREIGN PATENT DOCUMENTS

| CN | 101689203 B | 9/2013 |
| CN | 108898137 A | 11/2018 |

(Continued)

OTHER PUBLICATIONS

IBM: List of IBM Patents or Patent Applications Treated as Related (Appendix P), Mar. 12, 2020, pp. 1-2.

(Continued)

*Primary Examiner* — Daniel G Mariam
(74) *Attorney, Agent, or Firm* — Daniel G. DeLuca

(57) ABSTRACT

A computer-implemented method for processing a digital image. The digital image comprises one or more text cells, wherein each of the one or more text cells comprises a string and a bounding box. The method comprises receiving the digital image in a first format, the first format providing access to the strings and the bounding boxes of the one more text cells. The methods further comprises encoding the strings of the one or more text cells as visual pattern according to a predefined string encoding scheme and providing the digital image in a second format. The second format comprises the visual pattern of the strings of the one or more text cells. A corresponding system and a related computer program product is provided.

21 Claims, 13 Drawing Sheets

(56) References Cited

U.S. PATENT DOCUMENTS

| | | | |
|---|---|---|---|
| 6,981,209 B1 | 12/2005 | Parikh | |
| 7,543,229 B2* | 6/2009 | Peiro | G06T 7/0002 |
| | | | 715/243 |
| 9,032,006 B2 | 5/2015 | Bekas | |
| 9,262,380 B2 | 2/2016 | Bekas | |
| 10,089,742 B1 | 10/2018 | Lin et al. | |
| 10,210,178 B2 | 2/2019 | Souche et al. | |
| 10,331,976 B2 | 6/2019 | Akata | |
| 2004/0006742 A1 | 1/2004 | Slocombe | |
| 2004/0034455 A1 | 2/2004 | Simonds | |
| 2005/0053283 A1 | 3/2005 | Wakeam | |
| 2006/0200752 A1 | 9/2006 | Sellers | |
| 2006/0236237 A1 | 10/2006 | Peiro | |
| 2007/0168382 A1 | 7/2007 | Tillberg | |
| 2008/0168342 A1 | 7/2008 | Shur | |
| 2008/0317343 A1 | 12/2008 | Ferman | |
| 2009/0019011 A1 | 1/2009 | Lee | |
| 2009/0110268 A1 | 4/2009 | Dejean | |
| 2010/0131614 A1 | 5/2010 | Bremer, Jr. | |
| 2011/0255791 A1 | 10/2011 | Abdo | |
| 2014/0006982 A1 | 1/2014 | Wabyick | |
| 2014/0013215 A1 | 1/2014 | Sesum | |
| 2014/0314319 A1 | 10/2014 | Hamel | |
| 2014/0376804 A1 | 12/2014 | Akata | |
| 2015/0199314 A1 | 7/2015 | Ratnakar | |
| 2015/0199821 A1 | 7/2015 | Lyubarskiy | |
| 2015/0262007 A1 | 9/2015 | Sesum | |
| 2017/0213139 A1* | 7/2017 | Sawant | G06N 3/006 |
| 2017/0351681 A1 | 12/2017 | Bekas | |
| 2018/0075368 A1 | 3/2018 | Brennan | |
| 2018/0097812 A1 | 4/2018 | Gillett et al. | |
| 2018/0101726 A1 | 4/2018 | Wang et al. | |
| 2018/0300323 A1 | 10/2018 | Lee et al. | |
| 2018/0341688 A1* | 11/2018 | Ganesh | G06Q 10/063 |
| 2018/0365248 A1 | 12/2018 | Zheng | |
| 2019/0102674 A1 | 4/2019 | Kwant et al. | |
| 2019/0302997 A1 | 10/2019 | Kouda | |
| 2019/0385059 A1 | 12/2019 | Huang | |
| 2020/0005154 A1 | 1/2020 | Herbster | |
| 2020/0045354 A1 | 2/2020 | Gao | |
| 2020/0294187 A1 | 9/2020 | Staar | |
| 2021/0279400 A1 | 9/2021 | Staar | |
| 2021/0279516 A1 | 9/2021 | Staar | |
| 2021/0279636 A1 | 9/2021 | Staar | |

FOREIGN PATENT DOCUMENTS

| | | |
|---|---|---|
| CN | 110110258 A | 8/2019 |
| CN | 110188189 A | 8/2019 |
| JP | 08227422 A | 9/1996 |
| JP | 2006031129 A | 2/2006 |
| WO | 2018213205 A1 | 11/2018 |
| WO | 2021176281 A1 | 9/2021 |
| WO | 2021176282 A1 | 9/2021 |

OTHER PUBLICATIONS

Pending U.S. Appl. No. 16/811,457, filed Mar. 6, 2019, entitled: "Memory-Efficient Document Processing", 39 pages.

Pending U.S. Appl. No. 16/811,473, filed Mar. 6, 2019, entitled: "Ground Truth Generation for Image Segmentation", 35 pages.

Pending U.S. Appl. No. 16/811,421, filed Mar. 6, 2019, entitled: "Efficient Ground Truth Annotation", 35 pages.

International Searching Authority, "Notification of Transmittal of the international Search Report and the Written Opinion of the International Searching Authority, or Declaration," Patent Cooperation Treaty, dated Apr. 29, 2021, 7 pages, International Application No. PCT/IB2021/050612.

International Searching Authority, "Notification of Transmittal of the international Search Report and the Written Opinion of the International Searching Authority, or Declaration," Patent Cooperation Treaty, dated May 7, 2021, 7 pages, International Application No. PCT/IB2021/050648.

IBM: List of IBM Patents or Patent Applications Treated as Related (Appendix P), Nov. 5, 2021, 2 pages.

Mell et al., "The NIST Definition of Cloud Computing", Recommendations of the National Institute of Standards and Technology, NIST Special Publication 800-145, Sep. 2011, 7 pages.

Ahmed et al., "A Generic Method for Automatic Ground Truth Generation of Camera-Captured Documents", arXiv:1605.01189v1, May 4, 2016, pp. 1-15.

Moll et al., "Truthing for Pixel-Accurate Segmentation", The Eighth IAPR International Workshop on Document Analysis Systems, Sep. 16-19, 2008, pp. 379-385.

Schulman, "Recognizing and Generating Natural Language Referring Expressions in Images", Thesis Submitted in Partial Fulfillment of the Requirements for the Master of Sciences Degree Under the Supervision of: Prof. Michael Elhadad, Ben—Gurion University of the Negev, Aug. 21, 2018, 72 pages.

Kahou et al., "FigureQA: An Annotated Figure Dataset for Visual Reasoning", Workshop Track—ICLR 2018, arXiv:1710.07300v2, Feb. 22, 2018, pp. 1-20.

Konyushkova et al., "Discovering General-Purpose Active Learning Strategies", arXiv:1810.04114v2, Apr. 2, 2019, pp. 1-10.

Kodirov, 2017, arXiv sections 1-6.

Xian, 2018, arXiv sections 1-6.

Tao, Logical Labeling of Fixed Layout PDF Documents Using Multiple Contexts, 2014 11th IAPR International Workshop on Document Analysis Systems (Year: 2014).

* cited by examiner

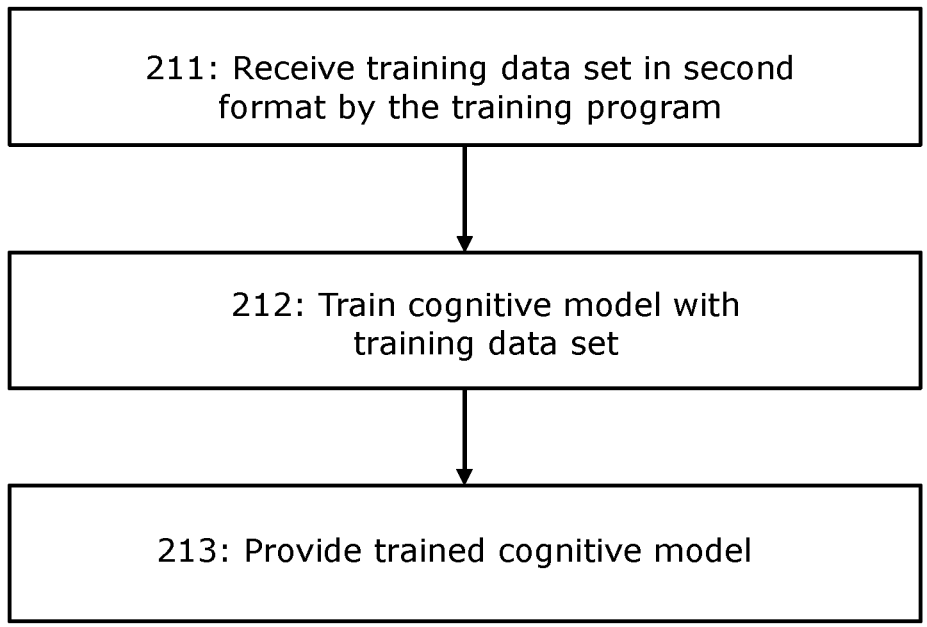
FIG. 2b   Training
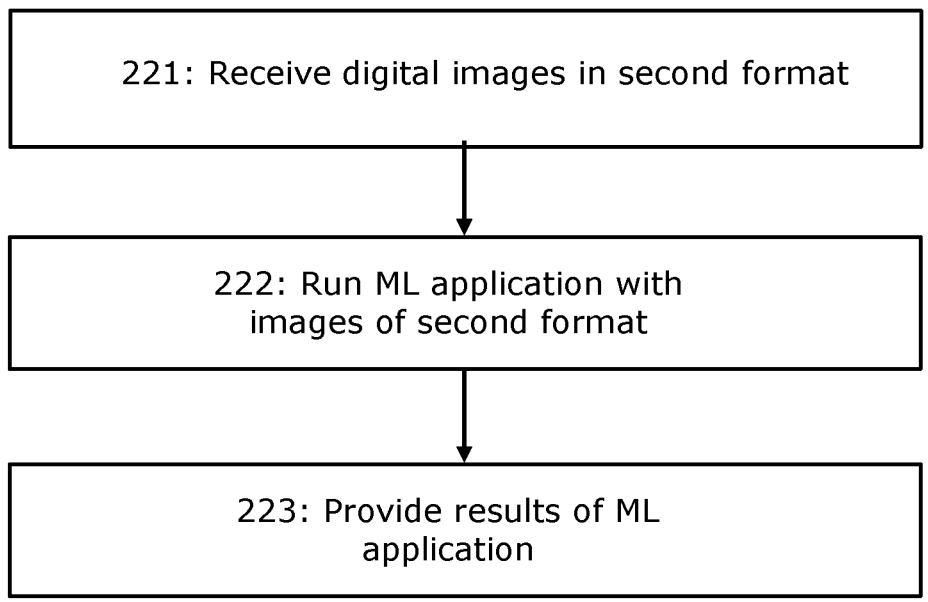
FIG. 2c   Inference   220

551     text cell: [ { ($x_0$, $y_0$), ($x_1$, $y_1$), text = "String1"}]
552     text cell: [ { ($x_0$, $y_0$), ($x_1$, $y_1$), text = "String2"}]
553     text cell: [ { ($x_0$, $y_0$), ($x_1$, $y_1$), text = "String3"}]
554     path: [ { ($x_0$, $y_0$), ($x_1$, $y_1$), ($x_2$, $y_2$), ($x_3$, $y_3$), color = black, width = 2.5 }]

DIGITAL IMAGE PROCESSING

BACKGROUND

The present invention relates to a computer-implemented method for processing a digital image.

The present invention further relates to a corresponding system and a corresponding computer program product.

In the era of big data, a huge number of electronic documents is available for data analysis including digital images. Textual presentations are often appearing as part of a digital image, e.g. a photo or a scan. Examples are "text-in-the-wild", e.g. a STOP sign in the context of road traffic, or text elements appearing in documents represented in bitmap format, e.g. from a scanner.

There are many use-cases in which such digital images may be analyzed and/or processed. As an example, machine learning (ML) algorithms may be applied to such images to perform a plurality of tasks. Such tasks include the classification of the image content, the segmentation of the image, the detection of objects in the image and many more.

Hence, there is a general need for advanced methods for image processing and image analysis, in particular for machine learning applications.

SUMMARY

According to an embodiment, the invention is embodied as a computer-implemented method for processing a digital image. The digital image comprises one or more text cells, wherein each of the one or more text cells comprises a string and a bounding box. The method comprises receiving the digital image in a first format, the first format providing access to the strings and the bounding boxes of the one more text cells. The methods further comprises encoding the strings of the one or more text cells as visual patterns according to a predefined string encoding scheme and providing the digital image in a second format. The second format comprises the visual patterns of the strings of the one or more text cells.

Such an embodied method allows to augment the visual pattern of the digital images of the second format with further or higher-level features. This may provide context to the processing application or the processing algorithm of the digital image and hence may improve the performance of the processing algorithm or the processing engine respectively.

According to an embodiment, the string encoding scheme is configured to encode natural language features of the string. Such natural language features may generally be any features of the natural language of the string. According to embodiments, this may encompass the meaning of the text or its language characteristics.

According to an embodiment, the computer-implemented method performs an image processing application with the digital image of the second format. The image processing application may use the information encoded in the visual pattern of the images of the second format to improve the performance of the image processing application.

According to an embodiment, the computer-implemented method performs a machine learning application with the digital image of the second format. In other words, the image processing application may be embodied as machine learning application. The machine learning application may use the information encoded in the visual pattern of the images of the second format to improve the performance of the ML algorithm. According to embodiments, the meaning of the text or its language characteristics may help the ML algorithm to increase its performance. The respective performance criteria depend on the respective task of the machine learning algorithm. In case of a classification algorithm, the ML algorithm may be made e.g. more robust in classification performance.

According to an embodiment, the machine learning application is a deep neural network application. Such deep neural network applications, e.g. convolutional neural network applications, may use the additional context provided by the visual patterns in an advantageous way.

According to an embodiment, the digital image of the first format and the digital image of the second format may comprise paths including corresponding path information, the path information comprising path coordinates.

According to an embodiment, the encoding of the strings comprises generating a word embedding of the string and generating the visual pattern from the word embedding of the string. According to embodiments such a word embedding maps words or phrases of the string to vectors of real numbers. A word embedding may involve a mathematical embedding from a space with many dimensions per word to a continuous vector space with a much lower dimension.

According to an embodiment, the predefined string encoding scheme is configured to encode the strings in dependence on the percentage of digits in the string. This may provide valuable context and information to the image processing application, in particular the machine learning application.

According to an embodiment, the method comprises applying within the bounding box of the text cell a first visual pattern if a predefined percentage of the characters in the string are digits. Else the method applies within the bounding box of the text cell a second visual pattern. The first visual pattern may comprise or consist e.g. of vertical lines and the second visual pattern may comprise or consist of horizontal lines or vice versa. This is an efficient encoding scheme.

According to another embodiment, the method may comprise coloring the bounding box of the text cell with a first color if a predefined percentage of the characters in the string are digits and else coloring the bounding box of the text cell with a second color. This is another efficient encoding scheme.

According to another embodiment a system for performing a computer-implemented method for processing a digital image is provided. The digital image comprises one or more text cells, wherein each of the one or more text cells comprises a string and a bounding box. The system comprises a processor and a computer readable memory. The system is configured to perform a method comprising receiving the digital image in a first format, wherein the first format provides access to the strings and the bounding boxes of the one more text cells. The system is further configured to perform a method comprising encoding the strings of the one or more text cells as visual patterns according to a predefined string encoding scheme and providing the digital image in a second format. The second format comprises the visual patterns of the strings of the one or more text cells.

According to another embodiment, a computer program product for processing a digital image by a system comprising a processor and a computer readable memory is provided. The digital image comprises one or more text cells, wherein each of the one or more text cells comprises a string and a bounding box. The computer program product comprises a computer readable storage medium having program instructions embodied therewith, the program instructions executable by the system to cause the system to perform a method comprising receiving the digital image in a first format. The first format provides access to the strings and the bounding boxes of the one more text cells. The method further comprises encoding the strings of the one or more text cells as visual patterns according to a predefined string encoding scheme and providing the digital image in a second format. The second format comprises the visual patterns of the strings of the one or more text cells.

Further embodiments relate to a computer-implemented method for training a machine learning application, a cognitive model for a machine learning application and a computer-implemented method for processing a digital image using the cognitive model.

Embodiments of the invention will be described in more detail below, by way of illustrative and non-limiting examples, with reference to the accompanying drawings.

BRIEF DESCRIPTION OF THE SEVERAL VIEWS OF THE DRAWINGS

FIG. 2b shows a flow chart of a method for training a cognitive model according to an embodiment of the invention;

FIG. 2c shows a flow chart of a method for performing a machine learning application according to an embodiment of the invention;

FIG. 5a illustrates an example of a digital image of a first format;

FIG. 5b shows a page file comprising gathered programmatic information of the digital image of FIG. 5a;

DETAILED DESCRIPTION

In reference to FIGS. 1-10, some general terms of embodiments of the invention are described.

A programmatic document may be defined as a document in which the fundamental components are represented by code. Such programmatic documents include e.g. documents in the Portable Document Format (PDF) or in Microsoft-Word format. A programmatic document may be generally defined as a document which is of the nature of or according to a program, schedule, or method.

Bitmap documents, e.g. scanned documents, are documents where the fundamental components are represented by colored pixels in an image. This includes e.g. documents in Portable Networks Graphic (png), Joint Photographics Expert Group (JPEG) or Tagged Image File Format (TIFF) format.

The term ground truth may generally refer to information provided by direct observation (i.e. empirical evidence) as opposed to information provided by inference. In the field of image segmentation and image analysis, it may refer in particular to the correct identity, position, size and coordinates of the individual symbols, e.g. the characters, as well as of text cells comprising words, paragraphs or titles and other layout information such as information on paths and bitmap resources.

The position and layout of text cells may be represented by bounding boxes. While generally bounding boxes may be character bounding boxes of the individual characters of a respective electronic image, according to embodiments of the present invention the term bounding box shall in particular refer to more global bounding boxes or in other words layout bounding boxes of the layout of the documents to be processed. This includes in particular bounding boxes which demarcate text cells comprising words, paragraphs, titles or footnotes of digital images.

Figure 1:
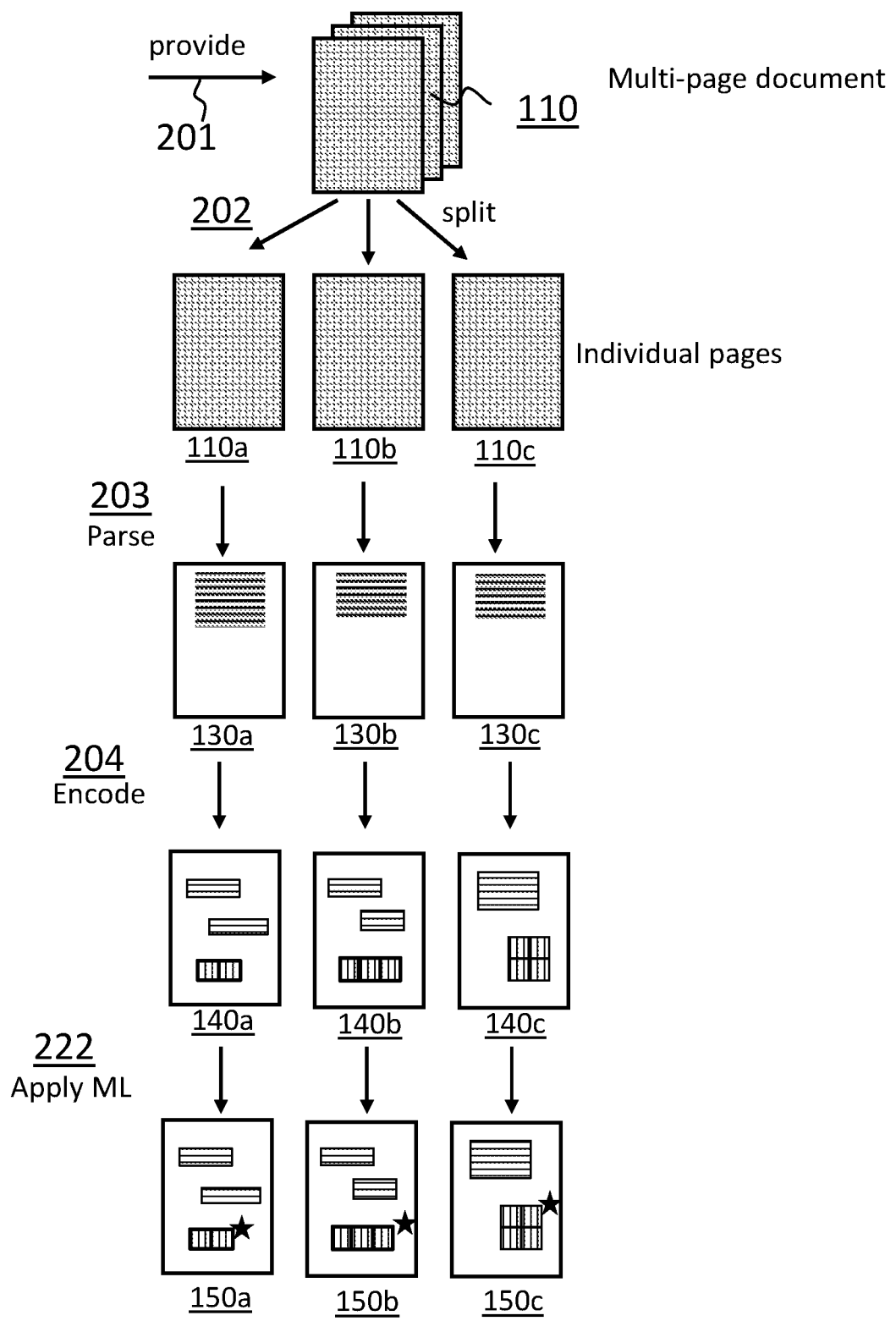
FIG. 1 illustrates a computer-implemented method for processing digital images according to an embodiment of the invention.
Figure 2A:
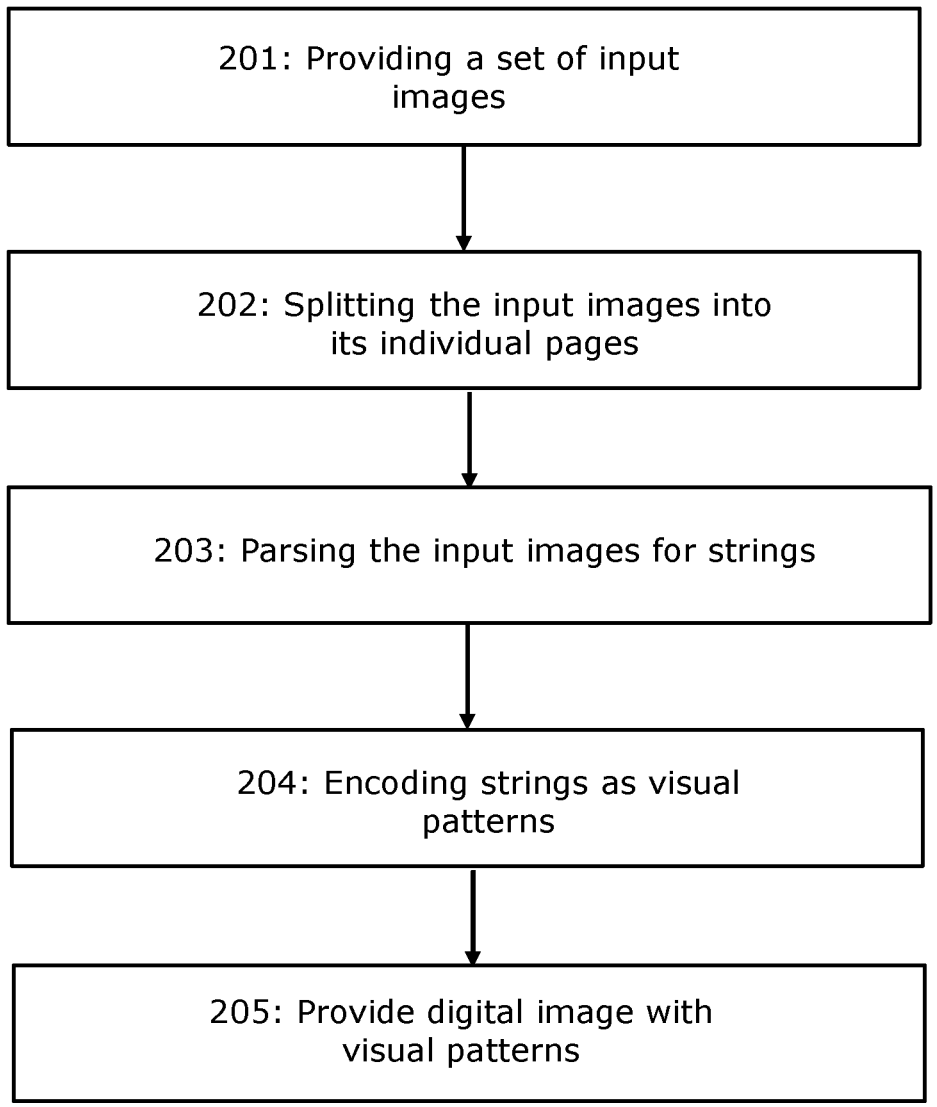
FIG. 2a shows a corresponding flow chart of the method illustrated in FIG. 1.

FIG. 1 illustrates a computer-implemented method for processing digital images according to an embodiment of the invention. FIG. 2a shows a corresponding flow chart of the method illustrated in FIG. 1 and FIG. 3 shows a schematic block diagram of computing system which may be used to perform the computer-implemented method as illustrated in FIGS. 1 and 2a.

Figure 3:
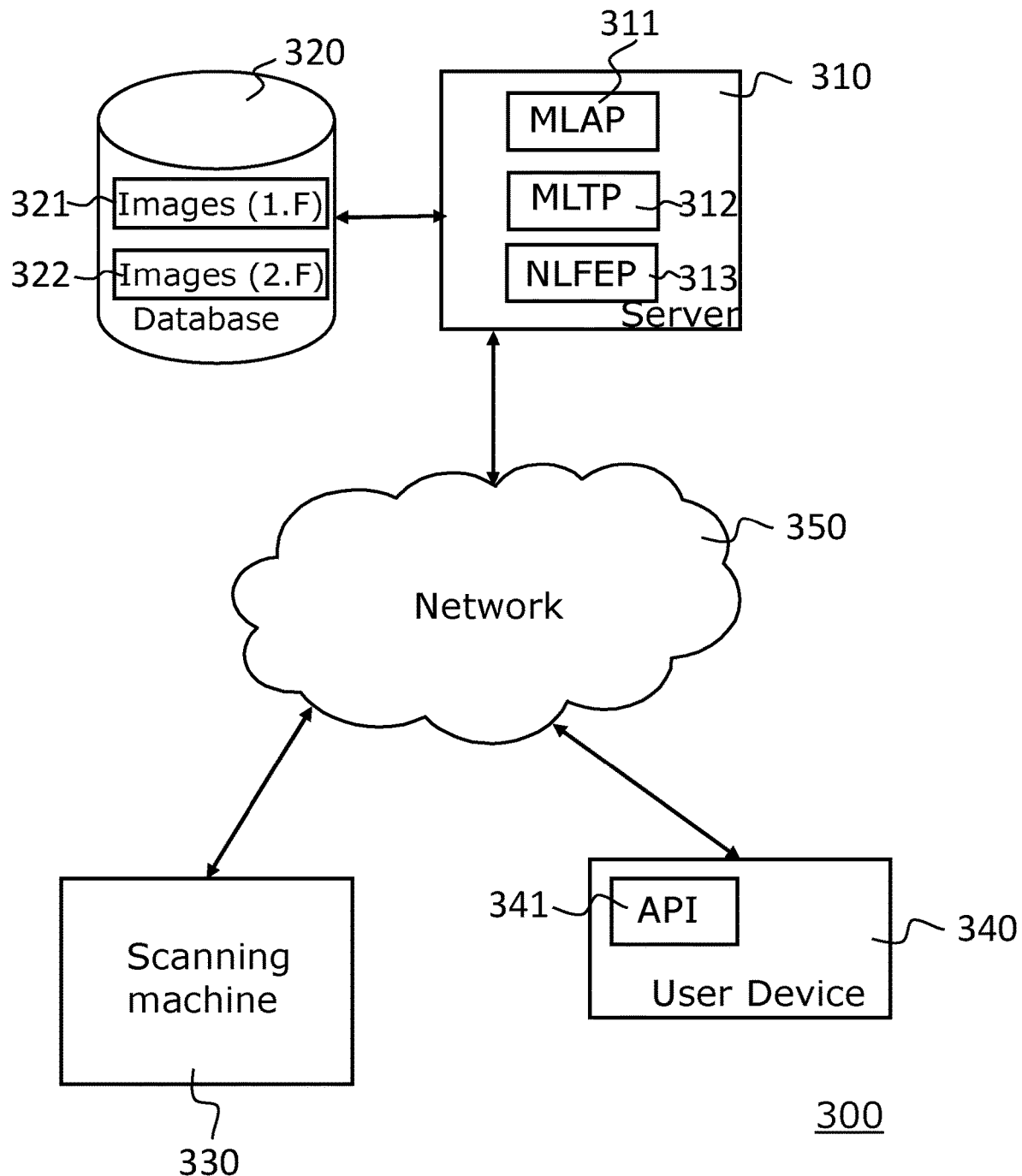
FIG. 3 shows a schematic block diagram of computing system which may be used to perform the computer-implemented methods as illustrated in FIGS. 1, 2a, 2b and 2c.

Referring at first to FIG. 3, it shows a computing system 300 comprising a server 310 which is configured to run a machine learning application program (MLAP) 311 and a machine learning training program (MLTP) 312 for training the machine learning application program. The machine learning application program 311 may be in particular a program for image processing.

The server 310 is coupled with a database 320. The database 320 may comprise a storage 321 for storing a plurality of input documents, more particularly a plurality of digital images of a first format. The database 320 may further comprise a storage 322 for storing a plurality of digital images of a second format which have been converted from the digital images of the first format.

The server 310 is further configured to run a natural language feature encoding program (NLFEP) 313. The natural language feature encoding program 313 is configured to transform or convert the digital images of the first format into digital images of the second format. This involves encoding the strings of one or more text cells of the digital images of the first format as visual pattern according to a predefined string encoding scheme as will be described in more detail further below.

The system 300 further comprises a scanning machine 330. The scanning machine 330 may provide scanning as well as printing functionality. Hence the scanning machine 330 may also be denoted as scanning/printing machine. The system 300 further comprises a user device 340. The user device 340 may comprise a display and user input means such as a keyboard to provide a user interface to a user of the system 300. The user device 340 may comprise in particular an application programming interface (API) 341 that is adapted to provide an interface to the programs 311, 312 and 313 running on the server 310.

The server 310, the scanning machine 330 and the user device 340 are coupled to a network 350 and may communicate with each other via the network 350. The network 350 may be embodied as a local area network (LAN), a general wide area network (WAN) and/or a public network (e.g., the Internet).

Referring now to FIGS. 1 and 2a, the method starts with a block 201. At the block 201, a set of input documents 110 of a first format is provided. The set of input documents 110 may be in particular embodied as a set of digital images of a first format. The set of input documents may be stored in the storage 321 of the database 320 and the set of input documents may be received e.g. via the network 350.

In FIG. 1 only one input document 110 is shown for ease of illustration. While the input document that is shown in FIG. 1 is embodied as a multi-page document, the input document may be generally also a single-page document, i.e. a single page digital image. In the example of FIG. 1, the input document 110 comprises three document pages 110a, 110b and 110c, more particularly three digital images 110a, 110b and 110c. Each of the digital images 110a, 110b and 110c comprise one or more text cells and each of the one or more text cells comprises a string and a bounding box.

The input document 110 is provided in a first format. According to embodiments, the first format may be a programmatic data format. As mentioned above such a programmatic data format may be defined as a data format that comprises code which represents or defines the fundamental components of the input document 110, in particular predefined items of the input document 110 such as the text cells and paths. The first format is a format that provides access to the strings and the bounding boxes of the one or more text cells, e.g. by parsing the documents of the first format.

According to embodiments, the first format may be in particular a format according to the Portable Document Format-standard, in particular according to any version of the ISO 32000-X standard of the International Standard Association. According to other embodiments, the first format may be a format according to the Java Script Object Notification Data Interchange Format, in particular according to any of the specifications by Douglas Crockford, e.g. RFC 8259, or any specifications by ECMA, e.g. ECMA 404 or any specifications by the International Standards Association, e.g. ISO/IEC 21778:2017. According to yet other embodiments, the first format may be a format according to the Hypertext Markup Language as developed by the Worldwide Web Consortium as standardized in particular by ISO/IEC 15445, W3C HTML 5, 3C HTML 4.0, W3C HTML 3.2 or any further versions. According to yet other embodiments, the first format may be a format according to the YAML Ain't Markup Language.

At a block 202, the input document 110 is split, e.g. by the machine learning application program 311 or a pre-processing program, into its individual document pages 110a, 110b and 110c.

At a block 203, the machine learning application program 311 parses the individual document pages 110a, 110b and 110c of the first format. This includes identifying a predefined set of items in each of the individual digital images 110a, 110b and 110c, in particular identifying the one or more text cells with their bounding boxes and their strings. The result of the parsing may be provided or gathered in documents 130a, 130b and 130c.

At a block 204, the natural language feature encoding program 313 encodes the strings of the one or more text cells that have been identified in the parsing block 203 as visual pattern according to a predefined string encoding scheme. The visual patterns may then be added to the digital images at the positions of the corresponding bounding boxes of the corresponding text cells. According to embodiments, the bounding boxes of the one or more text cells may be augmented with the visual patterns of the corresponding strings. According to embodiments, the natural language feature encoding program 313 may superimpose the visual patterns on the bounding boxes of the one or more text cells.

The digital images with the visual patterns establish or form digital images 140a, 140b and 140c of a second format which are provided, at a block 205 (see FIG. 2a), for further processing.

The digital images 140a, 140b and 140c of the second format may be stored e.g. in the storage 322 of the database 320.

Referring now to FIG. 2b, a computer-implemented method for training a machine learning application program for digital image processing is shown. The method as shown in FIG. 2b may be performed e.g. by the machine learning training program 312 as shown in FIG. 3.

At a block 211, a training data set is received, e.g. by the machine learning training program 312. The training data set comprises digital images of the second format.

At a block 212, the machine learning training program 312 trains a cognitive model of the machine learning application program 311 with the training data set.

At a block 213, the machine learning training program 312 provides the trained cognitive model as output.

Referring now to FIG. 2c, a computer-implemented method 220 for performing a machine learning application is provided. The method may be performed e.g. by the machine learning application program 311 as shown in FIG. 3. The machine learning application may be in particular a deep neural network application.

At a block 221, the machine learning application program 311 receives digital images in the second format.

At a block 222, the machine learning application program 311 uses the trained cognitive model to perform the machine learning application, e.g. with the digital images 140a, 140b and 140c of the second format as shown in FIG. 1.

At a block 223, the machine learning application program 311 provides results of the machine learning application as output, e.g. a classification of the received digital images or detected objects in the received input, 150a-150c.

The computer-implemented method 220 as shown in FIG. 2c establishes an inference phase of the machine learning application and its underlying algorithm.

Figure 4:
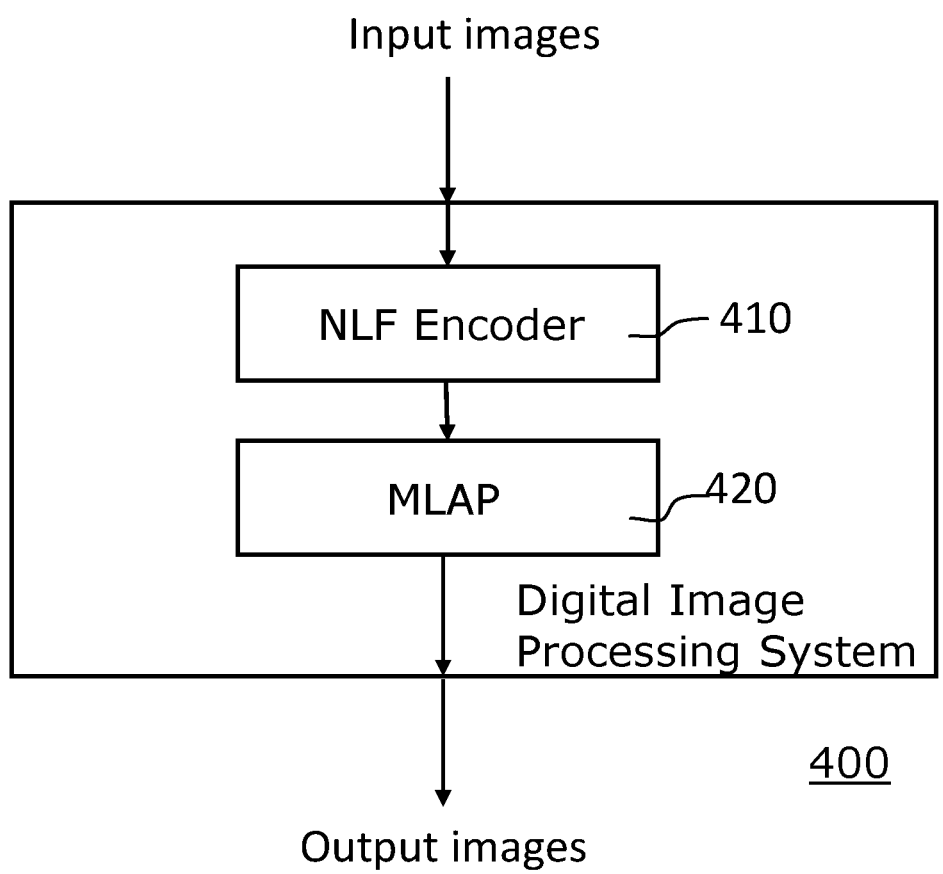
FIG. 4 shows a digital image processing system according to an embodiment of the invention.

Referring now to FIG. 4, a digital image processing system 400 according to an embodiment of the invention is shown. The digital image processing system 400 receives digital images as input, processes the digital input images and provides digital output images as output. The digital input images are in particular images which comprise one or more text cells, wherein each of the one or more text cells encompass a string and a bounding box. The digital input images are received in a first format, in particular a programmatic format, which provides access to the text cells and their strings and bounding boxes.

The digital image processing system 400 comprises a natural language feature (NLF) encoder 410 which is configured to encode the strings of the one or more text cells as visual pattern according to a predefined string encoding scheme. Such an encoding transforms or converts the digital images of the first format into digital images of a second format.

The digital image processing system 400 further comprises a machine learning application unit 420 which is configured to perform a machine learning application program (MLAP) on or with the digital images of the second format. The machine learning application unit 420 provides then as output the output images.

The digital image of the first format and the digital image of the second format may comprise paths including path information. The path information may encompass path coordinates.

Figures 5A, 5B:
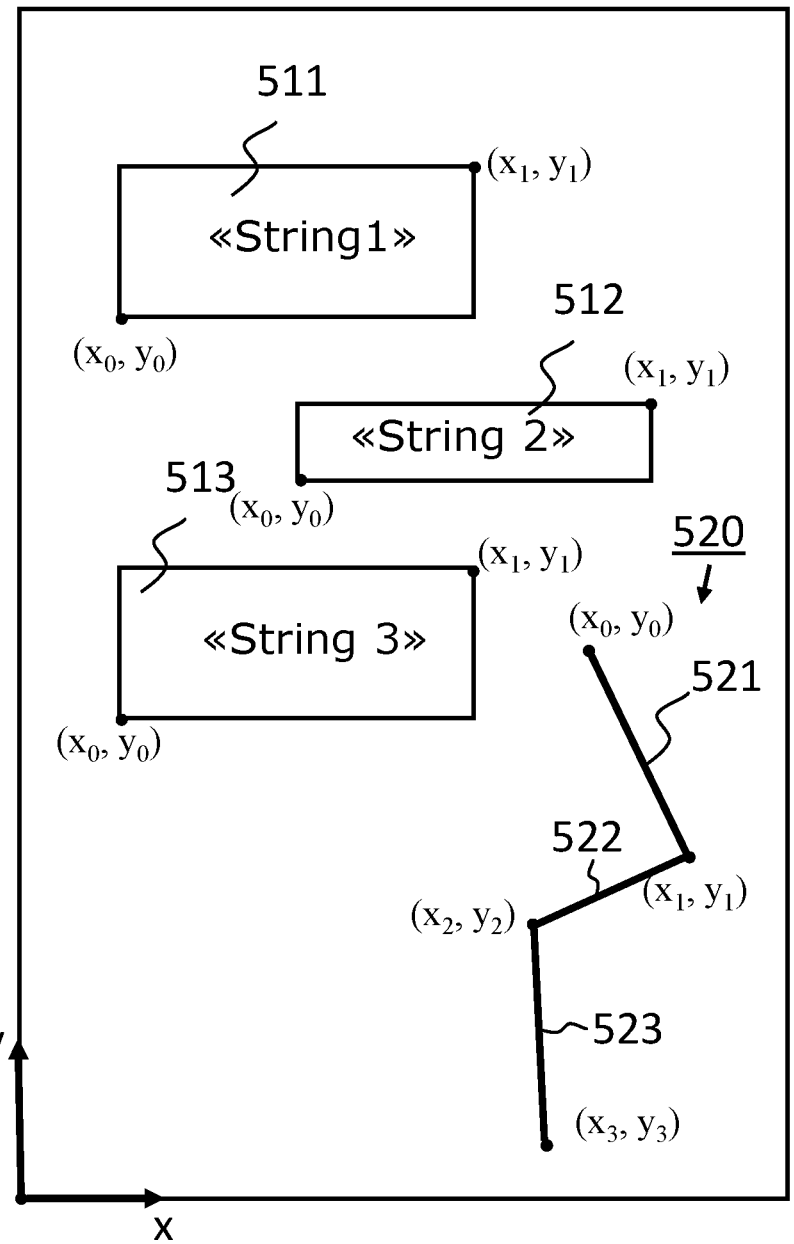

FIG. 5*a* illustrates an example of a digital image 500 of the first format which may be in particular a programmatic format such as the PDF-format. The digital image 500 comprises three text cells 511, 512 and 513. The text cell 511 comprises the exemplary text or string "String 1" as well as a bounding box defined by the coordinates (x0, y0) of the lower left corner and the coordinates (x1, y1) of the upper right corner. The coordinates may be defined e.g. with respect to a x-y-coordinate system that has its origin in the lower left corner of the digital image 500. Furthermore, the text cell 512 comprises the exemplary text or string "String 2" and the text cell 513 comprises the exemplary text or string "String3". In addition, both text cells 512 and 513 are defined by corresponding bounding boxes defined by the coordinates (x0, y0) of the lower left corner and the coordinates (x1, y1) of the upper right corner. It should be noted that for ease of illustration the coordinates of the bounding boxes are generally and uniformly denoted as (x0, y0) for the lower left corner and (x1, y1) for the upper right corner, wherein the variables x0, y0, x1 and y1 represent different actual values for the different bounding boxes.

In addition to the text cells the page 500 comprises a path 520. The path 520 comprises three straight lines 521, 522 and 523. The straight line 521 is defined by the coordinates (x0, y0) and (x1, y1) denoting the start point and the end point of the straight line 521, the straight line 522 is defined by the coordinates (x1, y1) and (x2, y2) denoting the start point and the end point of the straight line 522 and the straight line 523 is defined by the coordinates (x2, y2) and (x3, y3) denoting the start point and the end point of the straight line 523. It should be noted that the individual document page 500 may comprise many other elements such as pictures and background which are not shown in FIG. 5.

According to embodiments, the computer-implemented method may gather the programmatic information of the text cells 511, 512 and 513 as well as of the path 520 into a page file 550 as shown in FIG. 5*b*. Such a page file 550 may also be used as first format according to embodiments. The page file 550 corresponds to the parsed version of the digital image 500 of FIG. 5*a*. In this example the individual page file 550 comprises four lines 551-554, each comprising textual information about one of the predefined items of FIG. 5*a*.

Generally, any suitable syntax may be used to define the page file. In this example the string "text cell:" defines that parameters of a text cell are given in subsequent rectangular brackets. The rectangular brackets comprise the position of the lower left and upper right corner of the bonding box of the text cell, each in round brackets, followed by the text in parentheses after the string "text=". Corresponding examples for the text cells 511, 512 and 513 are provided in the lines 551, 552 and 553 respectively.

In addition, the string "path:" defines that parameters of a path are given in subsequent rectangular brackets. The rectangular brackets comprise the positions of the connection points or junctions of the path, followed by the color after the string "color=" and followed by the width of the path after the string "width=".

A corresponding example for the path 520 is provided in the line 554.

It should be noted that the exemplary format given above may comprise a plurality of further or other syntax elements to define the parsed and identified items of the digital images of the first format.

According to embodiments, the Java Script Object Notification Data Interchange Format (JSON-Format) may be used as first format. According to such an embodiment any of the specifications of JSON-Format by Douglas Crockford, e.g. RFC 8259, or any specifications of the JSON-Format by ECMA, e.g. ECMA 404 or any specifications of the JSON-Format by the International Standards Association, e.g. ISO/IEC 21778:2017, may be used. According to another embodiment, the Hypertext Markup Language as developed by the Worldwide Web Consortium and as standardized in particular by ISO/IEC 15445, W3C HTML 5, 3C HTML 4.0, W3C HTML 3.2 or any further versions may be used for the first format. According to yet another embodiment, the YAML Ain't Markup Language may be used as first format.

Figure 5C:
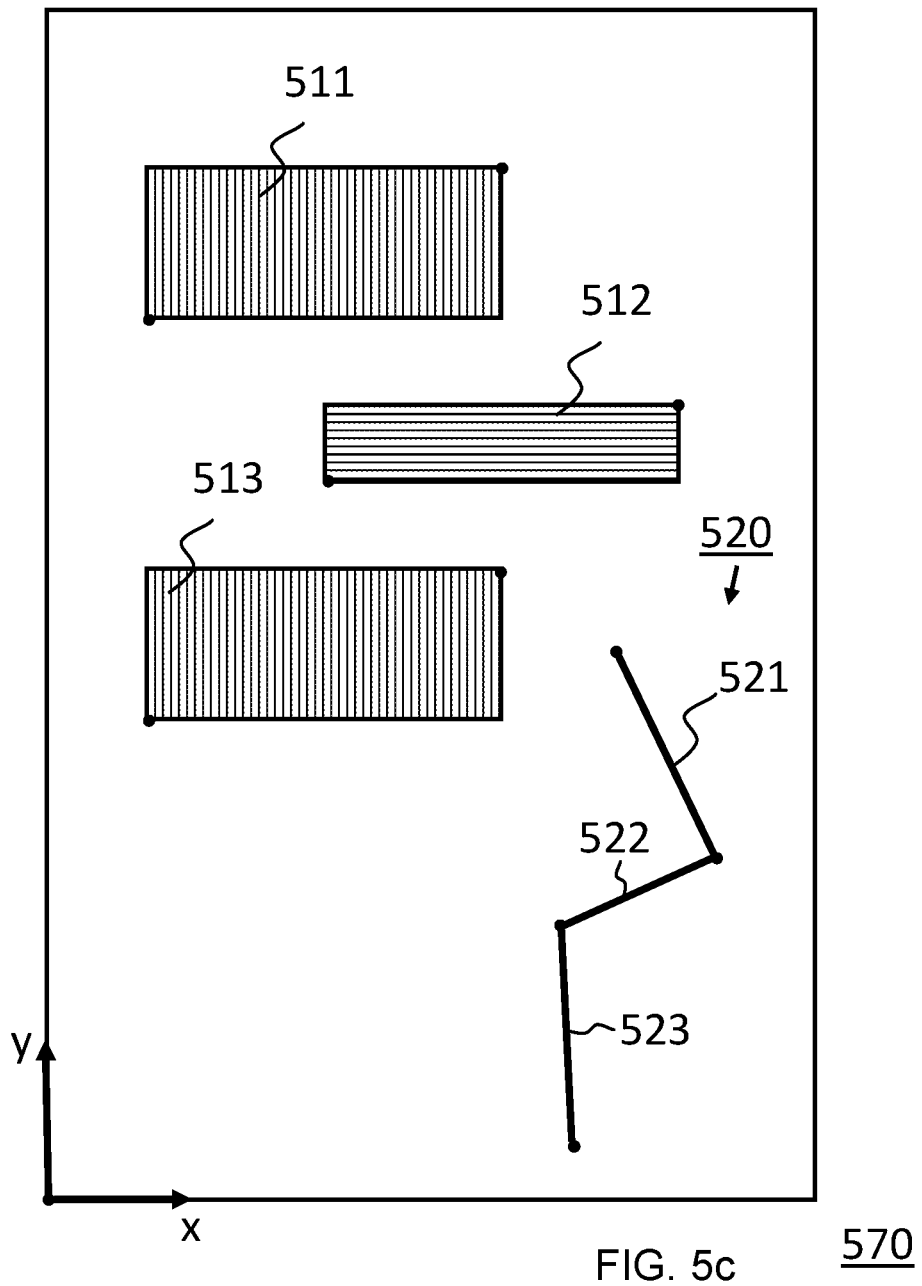
FIG. 5c illustrates an example of a digital image of a second format.

FIG. 5*c* illustrates an example of a digital image 570 of a second format. The natural language feature encoding program 313 has encoded the strings of the text cells 511, 512 and 513 as visual pattern according to a predefined string encoding scheme. The string encoding scheme according to this embodiment applies as a first visual pattern vertical lines and as second visual pattern horizontal lines in dependence on the content of the string. As an example, the vertical pattern may be applied if a predefined percentage of the characters in the string are digits and the horizontal pattern may be applied otherwise, or vice versa. In this example it is assumed that the strings "String 1" and "String3" comprise more than the predefined percentage of digits, e.g. more than 50% digits, and that the string "String2" comprises less than the predefined percentage of digits, e.g. less than 50% digits.

Figure 6A:
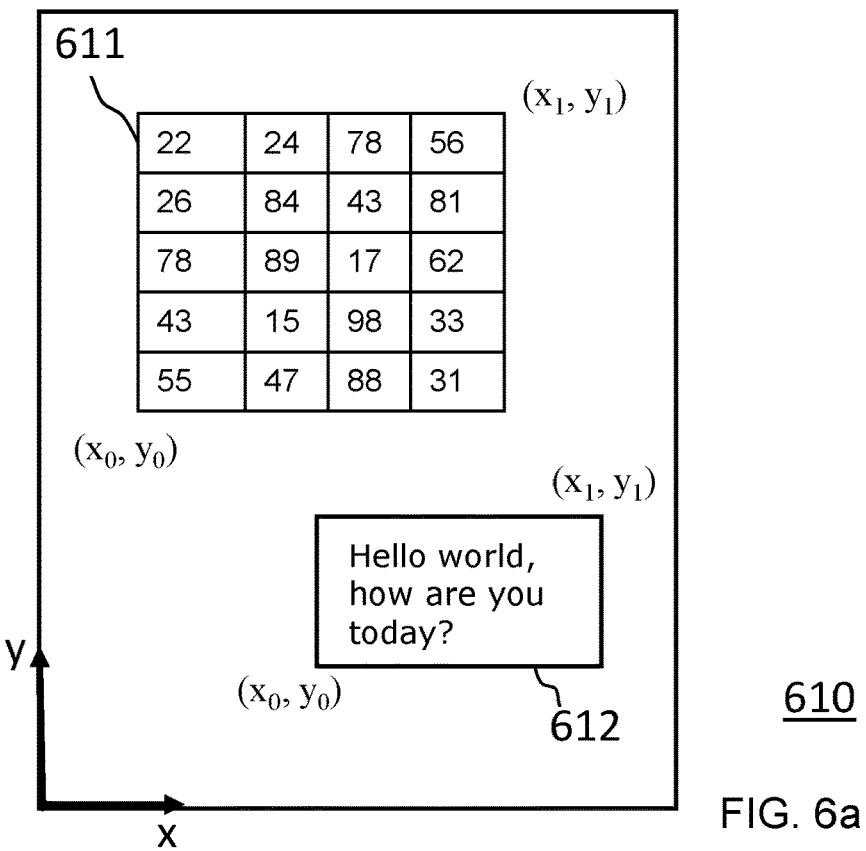
FIG. 6a illustrates an example of a digital image of a first format.

FIG. 6*a* illustrates another example of a digital image 610 of a first format. The digital image 610 comprises a text cell 611 comprising a table with a plurality of digits and a corresponding bounding box defined by the coordinates (x0, y0) of the lower left corner and the coordinates (x1, y1) of the upper right corner. The coordinates may be defined e.g. with respect to a x-y-coordinate system that has its origin in the lower left corner of the digital image 500. Furthermore, the digital image comprises a text cell 612 comprising a string "Hello world, how are you today?" and a corresponding bounding box.

Figure 6B:
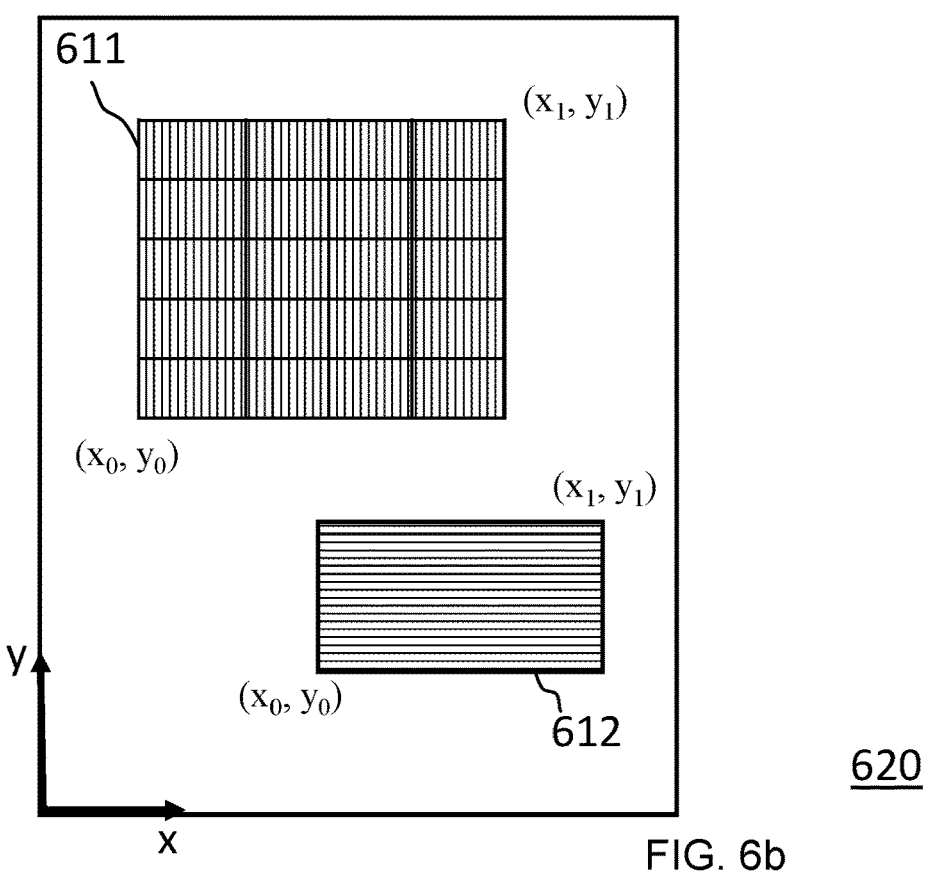
FIG. 6b illustrates an example of a digital image of a second format.

FIG. 6*b* illustrates an example of a corresponding digital image 620 of a second format. The natural language feature encoding program 313 has encoded the strings of the text cells 611 and 612 as visual pattern according to a predefined string encoding scheme. The string encoding scheme according to this embodiment applies as a first visual pattern vertical lines and as second visual pattern horizontal lines in dependence on the content of the string. More particularly, a vertical pattern has been applied if more than 50% of the characters in the respective text boxes are digits and the horizontal pattern is applied otherwise. Accordingly, the text box 611 is filled with a pattern of vertical lines and the text box 612 with a pattern of horizontal lines. According to embodiments, the text cell 611 may be split into a plurality of sub-cells comprising the individual cells of the table and the string encoding scheme may be applied individually and separately to each sub-cell.

Figure 7A:
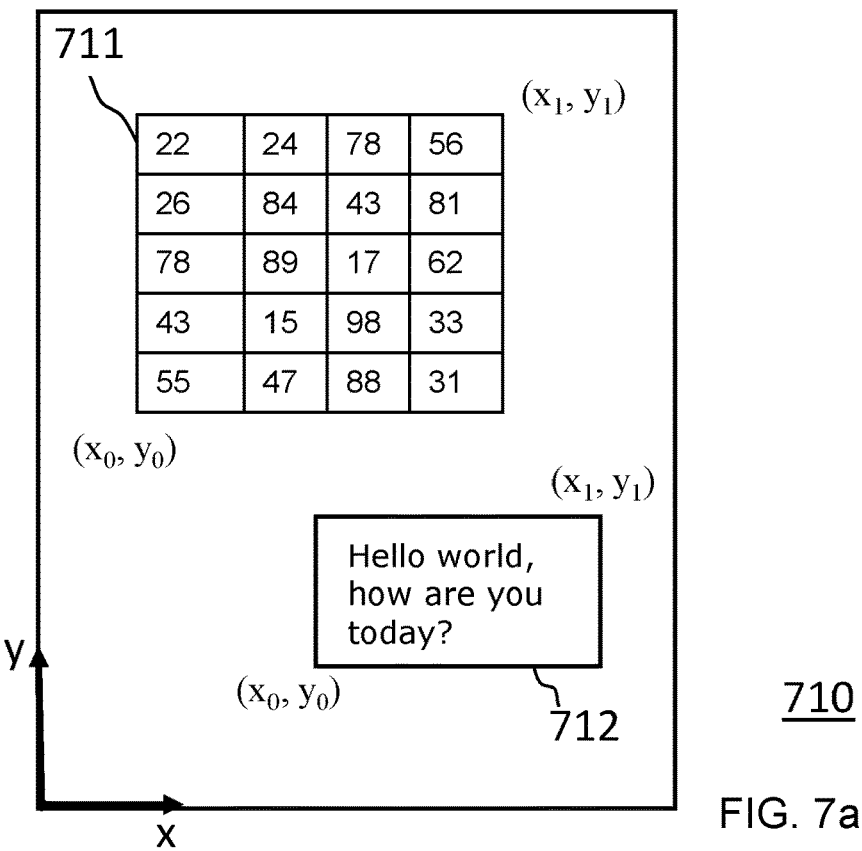
FIG. 7a illustrates another example of a digital image of a first format.

FIG. 7a illustrates another example of a digital image 710 of a first format. The digital image 710 comprises a text cell 711 comprising a table with a plurality of digits and a corresponding bounding box defined by the coordinates (x0, y0) of the lower left corner and the coordinates (x1, y1) of the upper right corner. Furthermore, the digital image 710 comprises a text cell 712 comprising a string "Hello world, how are you today?" and a corresponding bounding box.

Figure 7B:
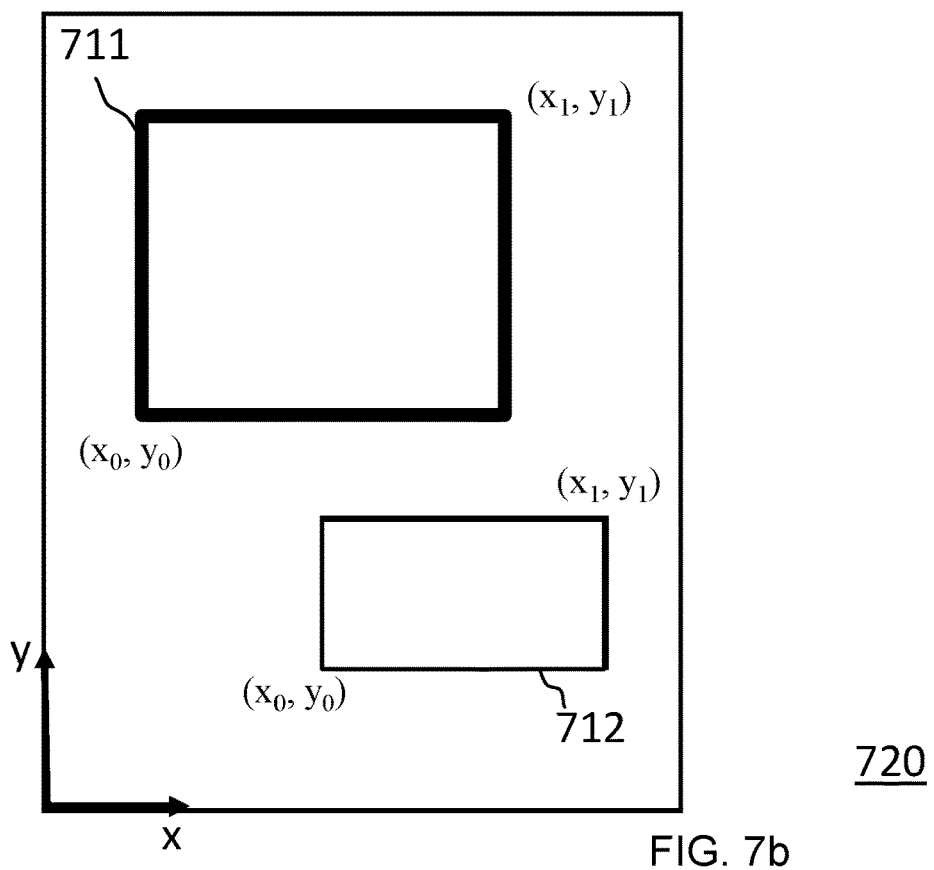
FIG. 7b illustrates another example of a digital image of a second format.

FIG. 7b illustrates an example of a digital image 720 of a second format. The natural language feature encoding program 313 has encoded the strings of the text cells 711 and 712 as visual pattern according to a predefined string encoding scheme. The string encoding scheme according to this embodiment colors the bounding box of a respective text cell with a first color if a predefined percentage of the characters in the string are digits. Else it colors the bounding box of the text cell with a second color.

In this example the natural language feature encoding program 313 has colored the text box 711 with a red color as first color which is indicated by the bold frame of the text box 711 and the text box 712 with a black color which is indicated by a relatively small frame of the text box 712 (smaller than the frame of the text box 712).

According to embodiments the string encoding scheme may use different frame thicknesses of the bounding boxes instead of different colors which would correspond to the representation as shown in FIG. 7b.

Figure 8A:
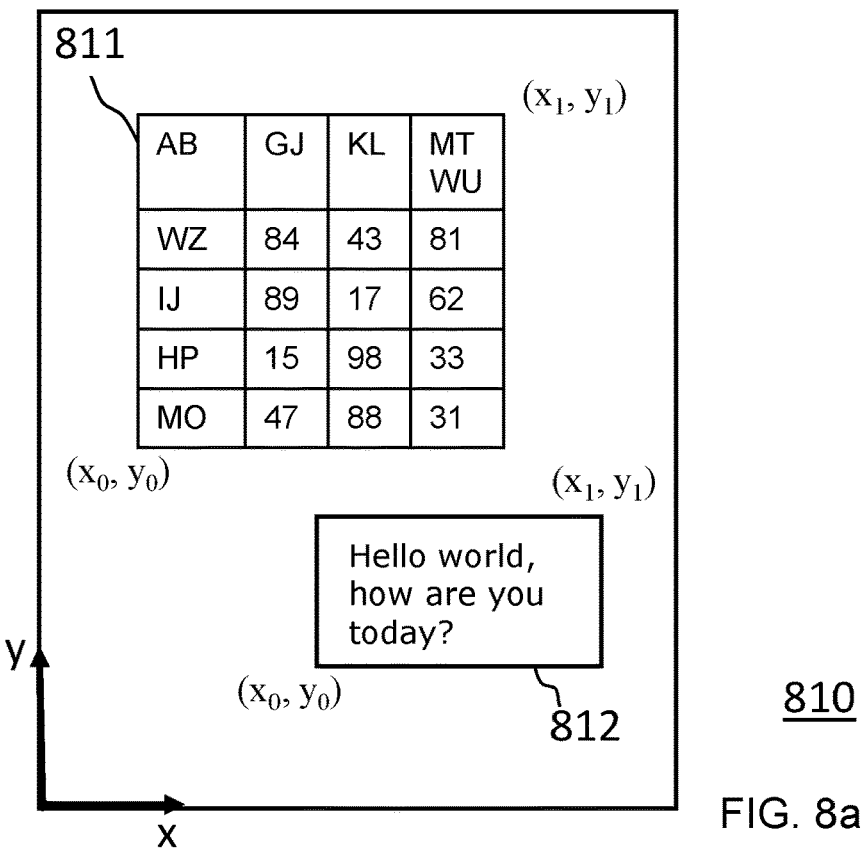
FIG. 8a illustrates another example of a digital image of a first format.

FIG. 8a illustrates another example of a corresponding digital image 810 of a first format. The digital image 810 comprises a text cell 811 comprising a table with a plurality of sub-cells, wherein the sub-cells may comprise various characters including alphabetic characters and digits.

Furthermore, the digital image comprises a text cell 812 comprising a string "Hello world, how are you today?" and a corresponding bounding box.

Figure 8B:
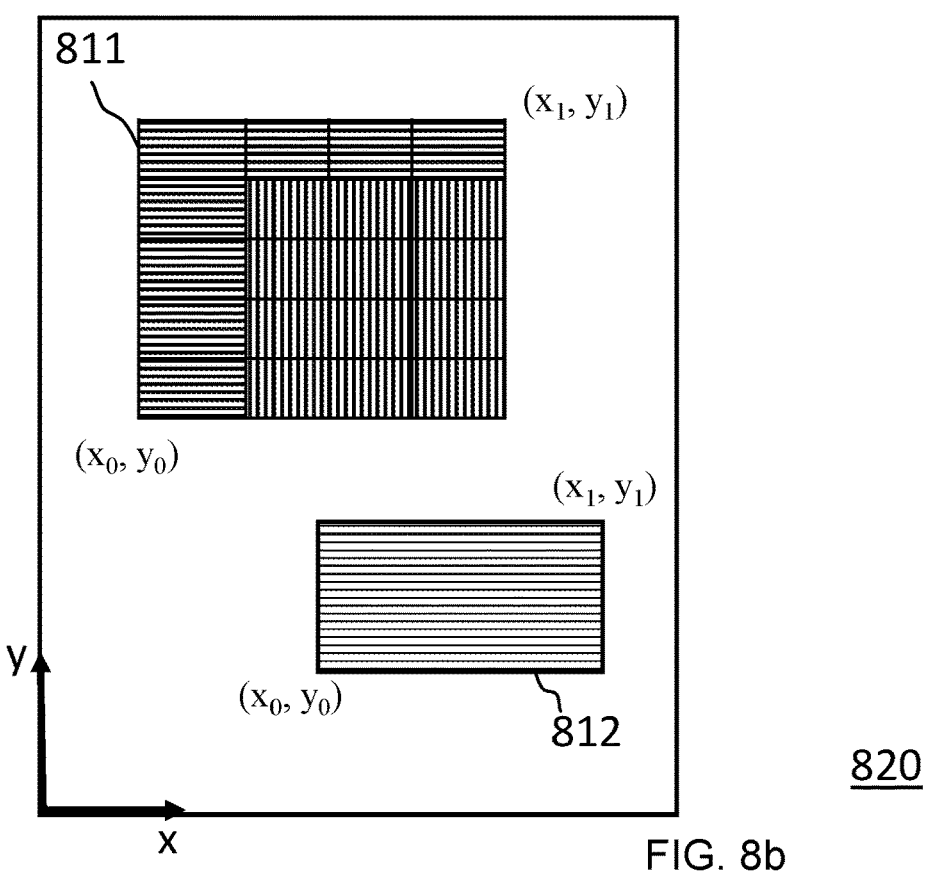
FIG. 8b illustrates another example of a digital image of a second format.

FIG. 8b illustrates an example of a digital image 820 of a second format. The natural language feature encoding program 313 has encoded the strings of the text cells 811 and 812 as visual pattern according to a predefined string encoding scheme. According to this embodiment the string encoding scheme is applied separately to each individual sub-cell of the table 811. The string encoding scheme according to this embodiment applies as a first visual pattern vertical lines and as second visual pattern horizontal lines in dependence on the content of the string of the sub-cells. More particularly, a vertical pattern has been applied if more than 50% of the characters in the respective sub-cell are digits and the horizontal pattern is applied otherwise. Accordingly, the sub-cells of the upper row and of the left column which comprise alphabetical characters comprise a horizontal pattern and the other sub-cells which comprise digits comprise a vertical pattern.

Figure 8C:
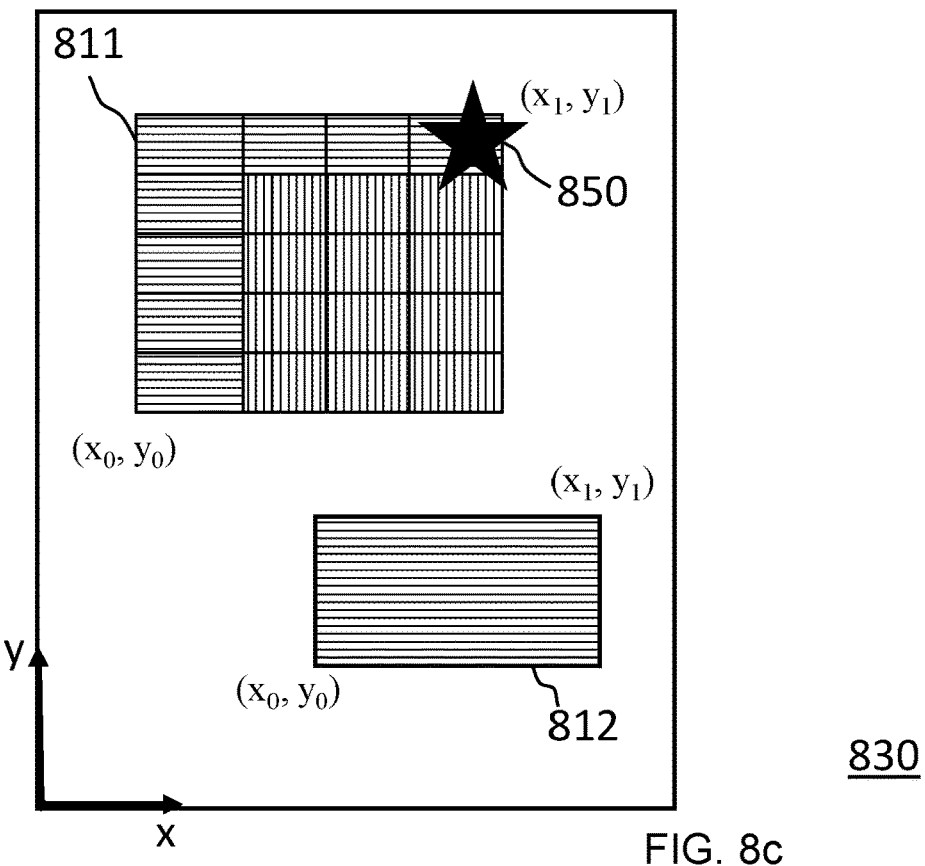
FIG. 8c shows a digital image illustrating an application of the visual encoding for the detection of tables.

FIG. 8c shows a digital image 830 illustrating an application of the visual encoding for the detection of tables, e.g. by a machine learning application. More particularly, the machine learning application program 311 of FIG. 3 may use the visual encoding of the digital image 820 for the detection of tables. Tables may be defined by the characteristic that they have a plurality of sub-cells comprising digits as visually encoded by the vertical pattern, and, optionally, by having an upper row and a left column with alphabetical characters as visually encoded by the horizontal pattern. Accordingly, the machine learning application program 311 may visually flag the table 811, as illustrated by a star 850 in the digital image 830.

Figure 8D:
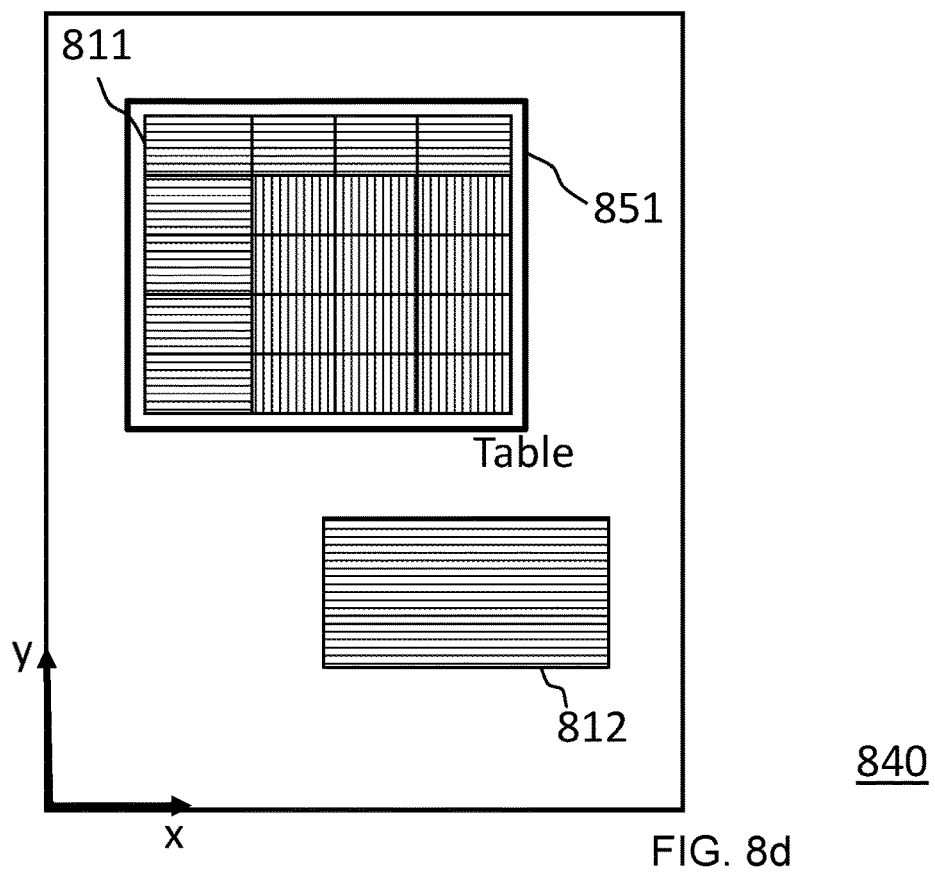
FIG. 8d shows a digital image illustrating also an application of the visual encoding for the detection of tables.

FIG. 8d shows a digital image 840 illustrating also an application of the visual encoding for the detection of tables, e.g. by a machine learning application. According to this example the machine learning application program 311 has visually flagged the table 811 by a frame 851 around the table 811.

Figure 9A:
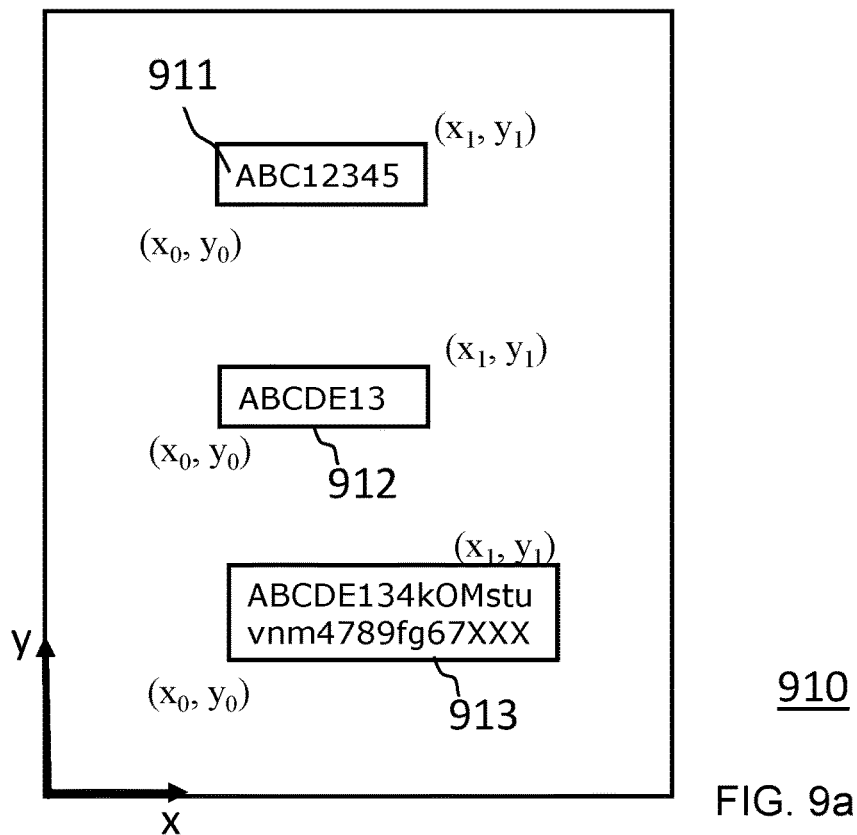
FIG. 9a illustrates another example of a digital image of a first format.

FIG. 9a illustrates another example of a digital image 910 of a first format. The digital image 910 comprises a text cell 911 comprising a string "ABC12345", a text cell 912 comprising a string "ABCDE13" and a text cell 913 comprising a string "ABCDE134kOMstuvnmm4789fg67XXX".

Figure 9B:
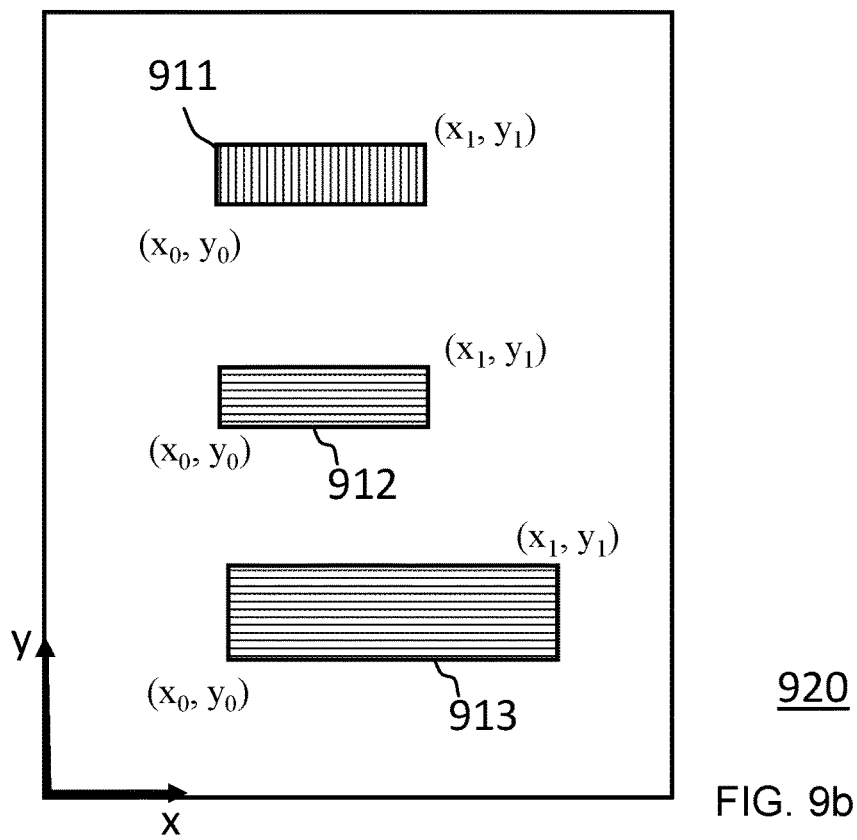
FIG. 9b illustrates an example of a corresponding digital image of a second format.

FIG. 9b illustrates an example of a corresponding digital image 920 of a second format. The natural language feature encoding program 313 has encoded the strings of the text cells 911, 912 and 913 as visual pattern according to a predefined string encoding scheme. The string encoding scheme according to this embodiment applies a vertical pattern if more than 50% of the characters in the respective sub-cell are digits and a horizontal pattern otherwise. Accordingly, the text cell 911 is encoded with a vertical pattern and the text cells 912 and 913 with a horizontal pattern.

Figure 10:
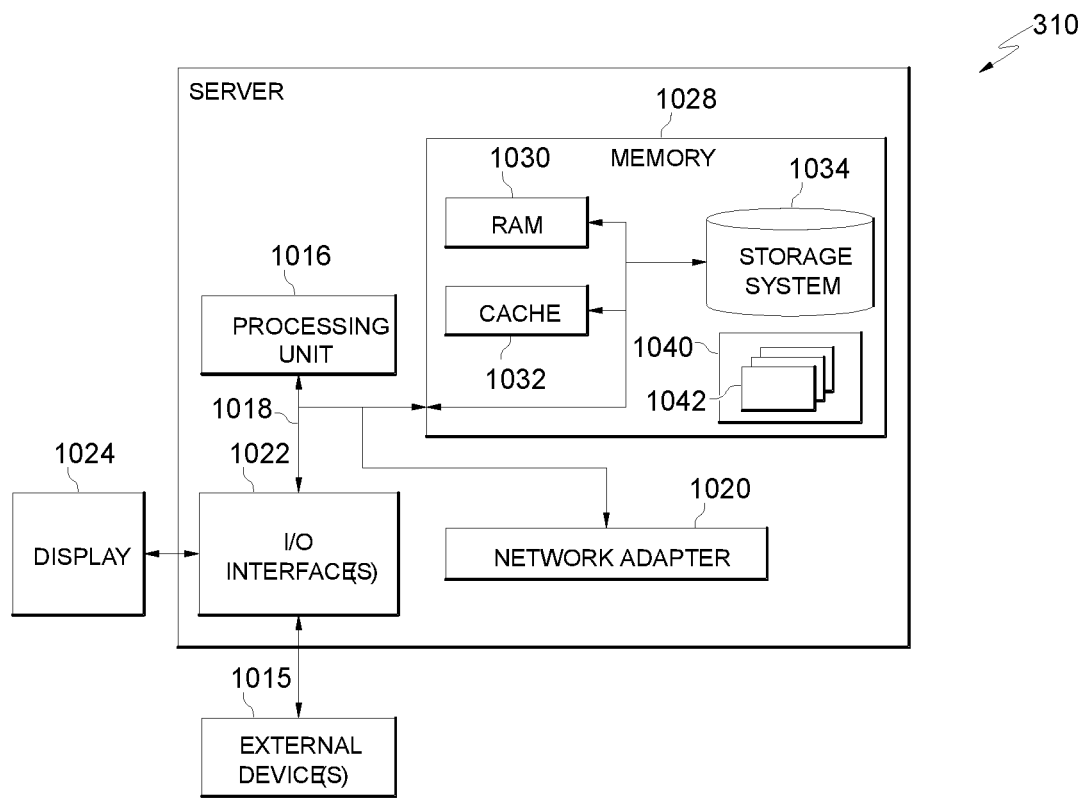
FIG. 10 shows a more detailed embodiment of the server of FIG. 3.

Referring now to FIG. 10, a more detailed embodiment of the server 310 is illustrated. The server 310 may be operational with other computing system environments or configurations. Examples of well-known computing systems, environments, and/or configurations that may be suitable for use with server 310 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. In particular the server 310 is operational with the scanning machine 330 of the system 300 and a user device 340 of the system 300 as shown in FIG. 3.

The server 310 may be described in the general context of computer system-executable instructions, such as program modules, being executed by a computer system. Generally, program modules may include routines, programs, objects, components, logic, data structures, and so on that perform particular tasks or implement particular abstract data types. The server 310 is shown in the form of a general-purpose computing device. The components of server 310 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server 310 typically includes a variety of computer system readable media. Such media may be any available media that is accessible by server 310, and it includes both volatile and non-volatile media, removable and non-removable media.

System memory 1028 can include computer system readable media in the form of volatile memory, such as random access memory (RAM) 1030 and/or cache memory 1032. Server 310 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein. Program modules 1042 may carry out in particular one or more steps of computer-implemented methods for processing digital images according to embodiments of the invention, e.g. one or more steps of the method as described with reference to FIGS. 2a, 2b and/or 2c. Program modules 1042 may encompass in particular the programs 311, 312 and 313 as described with reference to FIG. 3 and the corresponding flow charts in FIGS. 2a, 2b and 2c.

Server 310 may also communicate with one or more external devices 1015 such as a keyboard, a pointing device, a display 1024, etc.; one or more devices that enable a user to interact with server 310; and/or any devices (e.g., network card, modem, etc.) that enable server 310 to communicate with one or more other computing devices. Such communication can occur via Input/Output (I/O) interfaces 1022. Still yet, server 310 can communicate with one or more networks such as a local area network (LAN), a general wide area network (WAN), and/or a public network (e.g., the Internet) via network adapter 1020. As depicted, network adapter 1020 communicates with the other components of server 310 via bus 1018. It should be understood that although not shown, other hardware and/or software components could be used in conjunction with server 310. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor/processing unit of the server 310 and/or the user device 340 to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a digital image in a first format, the first format providing access to a strings and a bounding boxes of a one more text cells;
applying within the bounding box of the text cell a first visual pattern if a predefined percentage of the characters in the string are digits; and else
applying within the bounding box of the text cell a second visual pattern;
encoding the strings of the one or more text cells as visual patterns according to a predefined string encoding scheme, wherein the predefined string encoding scheme is configured to encode the strings in dependence on the percentage of digits in the string; and
providing the digital image in a second format, the second format comprising the visual patterns of the strings of the one or more text cells.

2. The method according to claim 1, wherein the string encoding scheme is configured to encode natural language features of the string.

3. The method according to claim 1, the method further comprising
performing a digital image processing application with the digital image of the second format.

4. The method according to claim 1, the method further comprising
performing a machine learning application with the digital image of the second format.

5. The method according to claim 4, wherein the machine learning application is a deep neural network application.

6. The method according to claim 4, wherein the machine learning application is configured to identify a predefined set of items within the digital image.

7. The method according to claim 4, wherein the machine learning application is configured to perform tasks selected from the group consisting of:
classifying the digital image and/or elements of the digital image based on the visual patterns of the text cells;
detecting tables in the digital image; and
detecting images in the digital image representing a page layout.

8. The method according to claim 1, wherein the digital image of the first format and the digital image of the second format comprises paths including corresponding path information, the path information comprising path coordinates.

9. The method according to claim 1, the method further comprising augmenting the bounding boxes of the one or more text cells with the visual patterns of the corresponding strings.

10. The method according to claim 1, the method further comprising
superimposing the visual patterns on the bounding boxes of the one or more text cells.

11. The method according to claim 1, wherein the encoding of the strings comprises
generating a word embedding of the string; and
generating the visual pattern from the word embedding of the string.

12. The method according to claim 1, wherein the first visual pattern comprises or consists of vertical lines and the second visual pattern comprises or consist of horizontal lines; or the first visual pattern comprises or consists of horizontal lines and the second visual pattern comprises or consist of vertical lines.

13. The method according to claim 1, the method comprising
coloring the bounding box of the text cell with a first color if a predefined percentage of the characters in the string are digits; and else
coloring the bounding box of the text cell with a second color.

14. The method according to claim 1, wherein the digital image of the first format comprises bitmap resources and their bounding boxes.

15. The method according to claim 14, further comprising
performing an optical character recognition on the bitmap resources;
identifying text cells including their strings and their bounding boxes in the bitmap resources; and
encoding the strings of the text cells of the bitmap images as visual patterns according to the predefined string encoding scheme.

16. The method according to claim 1, wherein the first format is a programmatic data format.

17. The method according to claim 1, wherein the first format is a format according to a Portable Document Format-standard.

18. The method according to claim 1, wherein the first format is selected from the group consisting of:
Java Script Object Notification Data Interchange Format;
Hypertext Markup Language; and
YAML Ain't Markup Language.

19. A system comprising one or more processors for executing computer-readable instructions, the computer-readable instructions controlling the one or more processors to perform operations comprising:
receiving a digital image in a first format, the first format providing access to strings and bounding boxes of one more text cells;
applying within the bounding box of the text cell a first visual pattern if a predefined percentage of the characters in the string are digits; and else
applying within the bounding box of the text cell a second visual pattern;
encoding the strings of the one or more text cells as visual patterns according to a predefined string encoding scheme wherein the predefined string encoding scheme is configured to encode the strings in dependence on the percentage of digits in the string; and
providing the digital image in a second format, the second format comprising the visual patterns of the strings of the one or more text cells.

20. A computer program product comprising a computer-readable storage medium having program instructions embodied therewith, the program instructions executable by a processor to cause the processor to perform operations comprising:
receiving a digital image in a first format, the first format providing access to strings and bounding boxes of one more text cells;
applying within the bounding box of the text cell a first visual pattern if a predefined percentage of the characters in the string are digits; and else
applying within the bounding box of the text cell a second visual pattern;
encoding the strings of the one or more text cells as visual patterns according to a predefined string encoding scheme wherein the predefined string encoding scheme is configured to encode the strings in dependence on the percentage of digits in the string; and
providing the digital image in a second format, the second format comprising the visual patterns of the strings of the one or more text cells.

21. The computer program product of claim 20, further comprising:
receiving digital images in a second format, the second format comprising visual patterns which encode strings of one or more text cells according to a predefined string encoding scheme; and
training a cognitive model of the machine learning application with the digital images of the second format.

\* \* \* \* \*